(12) United States Patent
Weir

(10) Patent No.: US 7,544,391 B1
(45) Date of Patent: Jun. 9, 2009

(54) METHOD OF MAKING A WATER RESISTANT SILICATE-BASED CERAMIC COMPOSITE MATERIAL

(75) Inventor: Richard L. Weir, Baltic, CT (US)

(73) Assignee: Hottec, Inc., Baltic, CT (US)

( * ) Notice: Subject to any disclaimer, the term of this patent is extended or adjusted under 35 U.S.C. 154(b) by 552 days.

(21) Appl. No.: 11/250,712

(22) Filed: Oct. 14, 2005

Related U.S. Application Data

(60) Provisional application No. 60/619,322, filed on Oct. 18, 2004.

(51) Int. Cl.
*B05D 3/10* (2006.01)
*B05D 1/18* (2006.01)

(52) U.S. Cl. .................. 427/344; 427/331; 427/337; 427/443.2

(58) Field of Classification Search ............. 427/331, 427/333, 337, 343, 443.2, 430.1
See application file for complete search history.

(56) References Cited

U.S. PATENT DOCUMENTS

| | | | | |
|---|---|---|---|---|
| 1,602,726 A | * | 10/1926 | Turk | 427/416 |
| 3,526,530 A | * | 9/1970 | Sams et al. | 427/344 |
| 3,804,650 A | * | 4/1974 | Meissner et al. | 106/286.5 |
| 4,284,664 A | | 8/1981 | Rauch, Sr. | |
| 4,347,285 A | * | 8/1982 | Batdorf | 428/332 |
| 4,936,939 A | | 6/1990 | Woolum | |
| 6,077,605 A | * | 6/2000 | McGowan et al. | 428/389 |
| 6,899,837 B2 | | 5/2005 | Mazany et al. | |
| 2004/0132607 A1 | * | 7/2004 | Wood et al. | 501/95.1 |

* cited by examiner

*Primary Examiner*—Timothy H Meeks
*Assistant Examiner*—David Turocy
(74) *Attorney, Agent, or Firm*—C. Nessler; N. Coppes-Gathey; Tobin, Carberry, O'Malley, Riley, Selinger, P.C.

(57) ABSTRACT

A method of creating a water resistant, silicate-based ceramic composite article is disclosed. The method comprises depositing the silicate-based ceramic composite article in a container; immersing the silicate-based ceramic composite article in a solution comprising water and a soluble chemical that reacts with high alkali ions present in the silicate-based ceramic composite article and reduces the pH of the silicate-based ceramic composite article; soaking the silicate-based ceramic composite article in the solution for a period of time; removing the silicate-based ceramic composite article from the solution; and drying the silicate-based ceramic composite article.

12 Claims, No Drawings

METHOD OF MAKING A WATER RESISTANT SILICATE-BASED CERAMIC COMPOSITE MATERIAL

PRIORITY CLAIM

This application claims priority to Provisional Patent Application Ser. No. 60/619,322, entitled "Method of Making Water Resistant Silicate Based Ceramic Composite" filed on Oct. 18, 2004, the disclosure of which is incorporated herein by reference in its entirety.

BACKGROUND

The present disclosure relates to composite articles, in particular, a light weight, high strength composite article that is both temperature and water resistant.

It has been determined that it would be cost effective to utilize light weight, fire resistant composite articles in the construction of military vehicles, such as aircraft, ships, amphibious vehicles, and the like, as well as for structures. U.S. Pat. No. 4,936,939 to Woolum discloses a graphite fabric reinforced ceramic matrix composite material that has good mechanical and thermal characteristics. The '939 patent discloses a composite article that comprises alkali silicate with ceramic powder fillers that are manufactured and dried. The dried silicate composite article is placed in a treatment bath consisting of a soluble multivalent cation salt where the resulting combination of cation, cation salt, and pH result in an insoluble ceramic cation silicate binder matrix composite article. These conventional composite articles made of alkali silicates have passed dry strength and fire resistance tests, but lose integrity when exposed to moisture or water. The highly alkaline nature of the ions that remain in the composite article after formation will dissolve the silicates when exposed to moisture or water, resulting in the loss of integrity of the composite article. Since these conventional composite articles are not water resistant, they are not suitable for military vehicles or for exterior uses.

What is needed in the art is a post-treatment process that is simple, cost effective, and provides the necessary water resistance to composite articles rendering the composite articles light weight, high strength, resistant to high temperatures, able to pass fire rating tests and water resistant.

SUMMARY

The disclosure is directed toward a method of creating a water resistant, silicate-based ceramic composite article. The method comprises depositing the silicate-based ceramic composite article in a container; immersing the silicate-based ceramic composite article in a solution comprising water and a soluble chemical that reacts with high alkali ions in the silicate-based ceramic composite article and reduces the pH of the silicate-based ceramic composite article; soaking the silicate-based ceramic composite article in the solution for a period of time; removing the silicate-based ceramic composite article from the solution; and drying the silicate-based ceramic composite article.

The disclosure is also directed towards a water resistant silicate-based ceramic composite article created by the above method.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

The present invention is a method for the creation of a water resistant, fire resistant, light weight composite material that can be used for the production of articles and structures. The conventional composite articles made of alkali silicates lose integrity when exposed to moisture or water. The highly alkaline nature of the ions that remain in the composite article after formation will dissolve the silicates when exposed to moisture or water, resulting in the loss of integrity of the composite article. The present invention is a method of treating conventional composite articles made of alkali silicates to become water resistant.

The method includes depositing a conventional high alkaline silicate-based composite article in a treatment bath comprising water and any soluble chemical that reacts with the high alkali silicate ion of the composite article to reduce the pH of the composite article. One example is a strong anion salt. The available cations associated with the anion salt would react with the high alkaline silicate ions and perform an ion exchange. The high alkaline silicate ions would combine with the strong anions and form a stable salt. In another example, the soluble chemical can be a metallic salt with an acid radical, which would form an insoluble silicate compound after the reaction. This binding of the high alkaline silicate ions stops the high alkaline silicate ions from creating the alkali condition that causes the composite article to break down when exposed to moisture or water. The resulting composite article becomes water resistant.

The ion exchange (or reaction) occurs in a manner that allows the composite article to retain its shape during the process of conversion to water resistance. The method can be utilized in various environmental conditions, including normal room temperature, which would permit the convenient treatment of large structures in simple tanks. The resulting composite article, having been treated by the solution (or cation silicate bonding matrix), is light weight, high strength, resistant to high temperatures, able to pass fire rating tests, and, most importantly, water resistant.

The method of making a composite article is known in the art. The composite article can be made by any number of conventional methods of fiber reinforced technology using a high alkaline silicate solution as a binder matrix for the composite article. Generally, a sodium silicate solution or potassium silicate solution acts as the binder matrix. This high alkaline binder solution is normally mixed with ceramic powders, such as aluminum oxide or silica powders, to act as further reinforcing elements. For the present invention, the preferred composite article to be treated can be comprised of any combination of fibers and powders that use the high alkali silicate solution as a binder matrix.

In order to create a water resistant composite article, the composite article is treated according to the following method. A composite article, created using a high alkaline silicate solution as a binder matrix, is immersed in a container having a solution. The solution comprises water and any soluble chemical that reacts with the high alkali silicate ions of the composite article to reduce the pH of the composite article. An example is a soluble salt. When the soluble salt dissolves in the water, it breaks into its ions (i.e., cations and anions). The soluble salt can be any soluble salt that when reacted with an alkali silicate of the silicate-based ceramic composite article results in a near neutral pH. The soluble chemical can be any chemical that causes the ion exchange, such as calcium chloride, magnesium chloride, aluminum chloride, ferrous chloride, zinc chloride, calcium carbonate, calcium nitrate, and the like, and combinations thereof.

Once immersed, the composite article undergoes a chemical reaction (or ion exchange) in which the high alkaline silicate ions in the composite article (i.e., from the high alkaline silicate binder utilized in the creation of the composite article) binds with the heavier and less alkaline ions of the solution to create a stable salt (or insoluble silicate compound) that remains in the solution (or on the exterior of the composite article, which is easily removed with water). That is, the high alkaline cations in the composite article bind with the silicates in the composite article to create a cation silicate within the composite article. The resulting composite article is a water resistant composite article that retains its solid form, dimensions and integrity after being treated with the method of the present invention.

The actual stoichiometry chemical reactions are not presented because of the many combinations of the silicate structures and crystals that can be utilized. However, an example of the ion exchange process is demonstrated below using calcium chloride:

This reaction of sodium silicate and calcium chloride produces an insoluble calcium silicate and the stable salt of sodium chloride.

The method of the present invention can be performed under a variety of environmental conditions. The soaking of the composite article can be completed when applying a vacuum to the environment in order to speed up the soaking process by eliminating any entrapped air that might block penetration of the treatment chemical. The amount of vacuum applied can be about 0 inches of mercury to about 30 inches of mercury. A cycling of applying vacuum followed by releasing to atmospheric conditions can also be utilized. Likewise, varying or cycling the pressure of the environment can facilitate the process. The pressure applied can vary from about 0 pounds per square inch (psi) to about 100 atmospheres. It is contemplated that a dual environment which varies the applied vacuum and pressure can also facilitate the reaction.

In order to be cost effective, the ideal temperature for treatment of the composite article is having the solution at room temperature. However, the temperature of the solution can be varied to facilitate the reaction, with a temperature range of about 30° F. to about 220° F. contemplated. Likewise, the time of treatment can be from about 30 minutes to about 500 hours, with about 24 hours to about 48 hours preferred. The temperature and time utilized is dependent upon the thickness of the composite art and can be determined easily by one skilled in the art.

Other cost effective and time saving measures include varying the concentrations of the soluble salt in the solution to be from about 5% by weight to about 100% by weight. The composite article can also be deposited in a solution containing crystals, be covered with crystals, or be encapsulated by crystals of the soluble chemical. Additionally, surfactants or wetting agents can be added to the solution in order to improve, enhance and facilitate the ion exchange or reaction.

The size and thickness of the composite article can vary depending upon the desired resulting product. One skilled in the art can easily determine the concentration of the solution, duration of processing, environmental conditions, etc., in order to achieve a water resistant composite article.

The following examples are illustrative of the present invention, and should not limit the scope of the present invention. Each example described herein was performed on flat rectangular composite articles formed by sodium silicate, aluminum oxide powder and carbon fibers. The composite article was between about 0.100 inches thick and about 0.375 inches thick. Each composite article was produced by hand lay-up and autoclave techniques, and dried until there was no further weight loss by drying.

EXAMPLE 1

A composite article of about 6 inches wide by about 6 inches in length and about ⅛ inch thick was placed in a container having a solution of 20% by weight calcium chloride and allowed to stand at room temperature conditions for 24 hours. A control sample of the same composite article was placed in pure water next to the composite article being treated. After 24 hours, the treated composite article appeared to be unchanged and the control sample had disintegrated and delaminated (i.e., the carbon fiber cloth was separated). The treated composite article was subsequently rinsed in water and dried. The treated composite article was dried at 170° F. for 4 hours and then the temperature was raised to 250° F. for an additional 4 hours. The dried treated composite article retained its strength and appeared unchanged by the treatment process. The dried treated composite article was placed in plain water for 24 hours. When removed, it had absorbed little water and was mechanically strong and appeared unchanged. The treated composite article was placed in another container of water for a period of 1 month and was checked periodically. There appeared to be a slight softening at the corners of the treated composite article, and yet it remained unchanged.

EXAMPLE 2

Several strips, about 1 inch wide by about 6 inches in length, were produced from a sodium silicate bonded carbon fiber composite article. The strips of the composite article were placed in several different pint containers containing a calcium chloride treatment solution (i.e., one strip per container). Each container had a different concentration by weight of calcium chloride. The concentrations were 0%, 5%, 10%, 20%, 30%, 40%, 50%, 60%, 70%, 80%, 90%, and 100% with crystals that had not dissolved. The treated strips of composite articles were placed in the solutions for a period of 24 hours. The results indicate that the strip of composite article that was placed in the 0% (or pure water) solution container completely dissolved. The strip of composite article placed in the container having the 5% solution was not disintegrated, but was softened. Each of the remaining strips of composite article exhibited good strength after treatment. It was concluded that the concentration of 5% solution did not have sufficient calcium and chloride ions to cause the appropriate reaction. The example illustrates that treatment of a composite article is successful over a large range of concentrations, as long as there is a sufficient mass and concentrations of soluble chemical.

EXAMPLE 3

Several strips, about 1 inch wide by about 6 inches in length by ⅛ inch thick were produced from a sodium silicate bonded carbon fiber composite article. The strips of composite article were placed in pint containers containing a 50% percent (by weight) solution of a single salt (i.e., one strip per container). The salts utilized included: calcium chloride, zinc chloride, magnesium chloride, iron chloride, calcium chloride, calcium carbonate and calcium nitrate. The strips of composite article were immersed in the solutions for 24 hours, removed from the containers, rinsed, and dried. The strips of composite article were then placed in water for 24 hours at room temperature, removed, and examined. All strips of composite article appeared to have retained their integrity, resisting weakening by water, and therefore, were water resistant.

EXAMPLE 4

A dish about 8 inches wide by about 8 inches in length by about 2 inches deep was filled to a depth of about ⅜ inch with commercial grade calcium chloride crystals. A sodium silicate bonded carbon fiber composite article, of about 6 inches wide by about 6 inches in length and about ⅛ inch thick, was placed directly on the crystals in the dish. A layer of the calcium chloride crystals, about ⅜ inch thick, was placed over the composite article. A 50% solution of calcium chloride and water was slowly added to cover the composite article and the layers of crystals (without disturbing them). The dish was covered and placed in a 170° F. oven for 24 hours. The dish was removed from the oven and allowed to cool where upon the mass hardened encapsulating the treated composite article. The mass was removed from the dish and placed in a bucket of warm water to dissolve the mass. Eventually, the crystal mass was removed from around the treated composite article. The treated composite article was rinsed in water and then dried. The treated composite article appeared unchanged from its pretreatment condition. The treated composite article was weighed and had a dried weight greater then the untreated sample, indicating that the treated composite article had undergone a chemical change. It is important to note that any adsorbed moisture would be a large percentage of the weight and changes in the weight may mask any real changes in the weight of the treated composite article from the ion exchange. The treated composite article was then placed in a 5 gallon pail of water for 1 month and examined periodically. The treated composite article did not appear to change shape over that period or show any softening, even at the corners.

EXAMPLE 5

A treated composite article was prepared as in Example 4. The treated composite article was then dried and subjected to a propane torch flame for 30 minutes (having a measurement of about 1900° F. by pyrometer). There was some loss of the surface material covering the carbon fiber weave and the weave has a bright orange glow. The side opposite to the flame had a dull orange glow but there was no penetration of the flame through the composite sample. There was virtually no smoke or fumes generated. The treated composite article proved to be an adequate fire barrier.

EXAMPLE 6

A sodium silicate bonded carbon fiber composite article of about 26 inches wide by about 26 inches length and about ⅜ inch thick was produced. A frame was created having measurements of about 30 inches wide by about 30 inches in length by about 2 inches deep. A plastic sheet was placed in the frame to act as a waterproof liner. About ½ inch thick layer of calcium chloride crystals was deposited within the frame on the plastic sheet. The composite article was laid on to the layer of crystals and an additional layer of calcium chloride crystals was placed on top of the composite article to a thickness of about ½ inch to create a crystal bed. A prepared 50% solution of water and calcium chloride was produced and gently poured into the frame, without disturbing the crystal bed. The composite article was treated for a period of 64 hours at room temperature. The treated composite article was removed, rinsed in water, and then soaked in water. The treated composite article showed no signs of softening. Subsequently, the treated composite article was cut up into samples and the edges were examined. The samples were soaked in tap water. The results indicate that the samples resisted water. Additionally, a sample cut from the treated composite article was subjected to the fire test as in Example 5. The treated composite article sample proved to be an adequate fire barrier.

EXAMPLE 7

A treated composite article was prepared as in Example 4. The treated composite article was then placed in a device to apply a hydro-test. The hydro-test comprises placing the treated composite article in a frame in which water is exposed to only one side of the treated composite article at various pressures. The hydro-test was completed in order to show that the treated composite article could hold back water at a pressure of 15 psi for a period of 30 minutes. The treated composite article remained structurally sound over the duration of the test, as well as an additional 30 minutes. A small amount of water appeared to drip through two specific spots in the treated composite article. This small amount of water was attributed to small voids in the treated composite article. However, during the test, the water seepage did not appear to increase. The results indicate that the treated composite article passed the hydro-test and was water resistant.

EXAMPLE 8

A thicker sodium silicate bonded carbon fiber composite article of about 6 inches wide by about 6 inches in length and about ¼ inch thick was carefully prepared to minimize voids. The composite article was treated as in Example 4 for a period of 72 hours. The hydro-test, as described in Example 7, was completed on the treated composite article. The results indicate that the treated composite article had no seepage, passed the hydro-test, and was water resistant.

EXAMPLE 9

A potassium silicate bonded carbon fiber composite article of about 6 inches wide by about 6 inches in length and about ⅛ inch thick was produced. The composite article was treated as in Example 4 for 48 hours. The treated composite article was placed in water for 1 month and checked periodically. The treated composite article showed the same water resistance as the treated composite article in Example 4.

EXAMPLE 10

A composite article was prepared as in Example 4. The treatment tray was placed in a vacuum chamber and vacuum was applied to about 28.5 inches of mercury and then released to atmosphere. This was repeated 6 times. When observed, there were small traces of bubbles indicating that there were small voids in the composite article. The treatment was allowed to stand at room temperature for 48 hours. The treated composite article was rinsed in water and then dried. The treated composite article was then placed in a tray of sodium silicate solution and the vacuum-to-atmosphere cycle was repeated 6 times. The treated composite article was then dried slowly at rising temperatures up to about 300° F. The treated composite article was then treated a second time in a solution of 50% calcium chloride with the vacuum-to-atmosphere cycle for 6 times. The treated composite article remained in the solution for 24 hours. The treated composite article was then dried and placed in a vacuum chamber. During the applied vacuum, virtually no bubbles were observed in the treated composite article. It was determined that multiple treatments can seal voids and can create a denser article.

The present invention is a method for the creation of a water resistant, fire resistant, light weight composite material that can be used for the production of articles, vehicles and structures. The present invention is also an article created according to this method. Water resistant composite articles are needed in order to make articles that are light weight, high strength, resistant to high temperatures, and able to pass fire rating tests for use in all military vehicles and exterior structures.

There are several benefits to using this method and the articles produced from this method. The composite article retains its shape during the process of conversion to water resistance. The method can be utilized in various environmental conditions, including normal room temperature, which would permit the convenient treatment of large structures in simple tanks. The method is cost effective by not requiring expensive treatment facilities or dangerous and environmentally hazardous chemicals and materials. The method can be completed by applying a vacuum to the composite article or by pressure chamber immersion. The resultant composite article, having been treated by the cation silicate bonding matrix, is light weight, high strength, resistant to high temperatures, able to pass fire rating tests, and, most importantly, water resistant.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

What is claimed is:

1. A method of creating a water resistant and fire resistant ceramic structural composite article comprising the steps of:
    (a) intermixing carbon fibers with an alkali metal silicate solution and drying the mixture, to coat the fibers and interconnect the fibers with an alkali metal silicate binder, thereby forming a fire-resistant silicate-base ceramic composite article having a particular shape and structural integrity, which article is soluble in water;
    (b) contacting said fire-resistant silicate-base ceramic composite article with an aqueous solution comprising a soluble chemical which provides metal ions that replace the alkali metal ions of said alkali metal silicate binder, wherein said soluble chemical is selected from the group consisting of a strong anion salt, a metallic salt with an acid radical, and combinations thereof, using a time of contacting and temperature of solution and a concentration of said soluble chemical in said solution that effects the replacement of said alkali metal ions and maintains said particular shape;
    (c) removing said article from contact with said solution and drying the article; wherein said particular shape and said structural integrity are substantially unchanged; and, wherein the replacement of said ions in the binder makes the fire-resistant silicate-base ceramic composite article into a water resistant article.

2. The method of claim 1, wherein said soluble chemical is an alkali metal chloride salt and has a concentration of more than about 10 percent by weight in said aqueous solution.

3. The method of claim 1, wherein, during step (b), said soluble chemical is selected from the group consisting of calcium chloride, magnesium chloride, aluminum chloride, ferrous chloride, zinc chloride, calcium carbonate, calcium nitrate, and combinations thereof.

4. The method of claim 1 wherein said aqueous solution is at a temperature of about 30 F to 220 F during step (b).

5. The method of claim 1 wherein during step (b) the aqueous solution is subjected to one or more cycles of pressure change, wherein the pressure applied to the solution is either greater or less than atmospheric pressure.

6. The method of claim 1, further comprising: while carrying out step (b), putting one or more surfaces of said silicate-based ceramic composite article in contact with a mass of undissolved crystals of said water soluble chemical.

7. A water resistant and fire resistant silicate based ceramic structural composite article created according to the method of claim 6.

8. The method of claim 1 wherein the silicate-based ceramic composite article is immersed in said aqueous solution during the step (b).

9. The method of claim 1 wherein the silicate-based ceramic composite article is rinsed in water after removing the article from contact with said aqueous solution and before drying, as part of step (c).

10. A water resistant and fire resistant silicate based ceramic structural composite article created according to the method of claim 1.

11. The method of claim 1 further comprising:
    (d) contacting the article after step (c) with an alkali metal silicate solution of the same kind as used in step (a); and then, subjecting the article to step (b) and step (c) again.

12. The method of claim 11 wherein one or more cycles of pressure change relative to atmospheric pressure are applied to the solution during step (d) and during each of the steps (b).

* * * * *